United States Patent Office 3,034,936
Patented May 15, 1962

3,034,936
SOLID COMPOSITE PROPELLANTS CONTAINING OXAMIDE DIHYDRAZONE
Ken Matsuda, Lucille T. Morin, and Raymond H. Mattson, Stamford, Conn., assignors to American Cyanamid Company, New York, N.Y., a corporation of Maine
No Drawing. Filed Nov. 14, 1958, Ser. No. 773,846
6 Claims. (Cl. 149—19)

This invention relates to solid propellant compositions of the type used in rocket missiles and has for its principal object the provision of novel propellants of this class characterized by high specific impulses.

We have found that oxamide dihydrazone and its condensation products with glyoxal have unusually high specific impulses when used with stoichiometric amounts of conventional solid propellant oxidizers such as the alkali metal and ammonium perchlorates and nitrates. These compounds present the further important advantage that they can be easily and readily prepared in a straightforward manner from inexpensive and abundant raw materials, and are therefore cheap and easily obtained in large quantities.

Oxamide dihydrazone, which is sometimes called oxalimidic acid dihydrazide and has the formula $$H_2N.NH.C(:NH)—C(:NH).NH.NH_2$$

can be prepared in almost quantitative yields by introducing cyanogen gas into an alcoholic solution of hydrazine at about 0°–5° C. The desired produce is recovered by filtration and drying and is a crystalline solid capable of being ground to the degrees of fineness desired in molded propellant grains.

When this material is reacted with glyoxal in acidic aqueous or alcoholic solution polymeric condensation products are obtained that are also well suited for use in admixture with oxidizers of the above class as solid propellant fuels or as components thereof. The condensation products are friable solids that do not melt upon heating to 250° C. and which are therefore suitable for use in cylindrical or other molded shapes. Condensation products of this character are obtainable with a molar ratio of glyoxal to oxamide dihydrazone of at least 1:1 and the condensation products of 2 mols of glyoxal with 1 mol of the dihydrazone are preferred.

As is indicated above, oxamide dihydrazone and its glyoxal condensation products can be used in admixture with any of the conventional oxidants now used in solid rocket propellant fuels. Ammonium perchlorate, potassium perchlorate, lithium perchlorate, ammonium and potassium nitrates and mixtures thereof are preferred. The heat of combustion of oxamide dihydrozone is 4.270 kilogram calories per gram and that of its polymer with 2 mols of glyoxal is 4.300 kilogram calories per gram. Using stoichiometric amounts of ammonium perchlorate as oxidizer the calculated specific impulses for these materials are in the range of 200–225 seconds which compares favorably with the maximum specific impulses of about 190 seconds for presently known solid rocket propellants.

The propellant mixtures of our invention can be used either alone or in admixture with other ingredients of the types frequently employed in preparing compressed, molded or extruded composite propellant grains. For example 22 parts by weight of oxamide dihydrazone and 78 parts of potassium perchlorate may be mixed uniformly with about 10–30 parts of a suitable binder such as asphalt or a vinylite or nitrocellulose resin and the mixture molded into a cylinder of suitable length and thickness. As another example a mixture of 58 parts by weight of oxamide dihydrazone, 68 parts of an oxamide dihydrazone-glyoxal condensation product, 85 parts of synthetic rubber and 425 parts of potassium perchlorate may be used. Other binders, fuel fillers, opacifiers, coolants, plasticizers and the like may be added as is well known to those skilled in the art. The propellants of the invention may be ignited by a charge of black powder or by other suitable means.

The invention will be further described and illustrated by the following specific examples to which, however, it is not limited.

EXAMPLE 1

*Preparation of Oxalimidic Acid Dihydrazide*

Cyanogen gas $(CN)_2$ is bubbled into a rapidly stirred solution of 32.1 grams (2 mols) of hydrazine in 300 ml. of ethanol maintained at 5° C. during a period of one hour, after which time one mol of the cyanogen has been introduced. The product is recovered by filtration and drying.

EXAMPLE 2

*Oxamide Dihydrazone-Glyoxal Condensation Product*

A solution of 9 grams (0.08 mol) of the oxalimidic acid dihydrazide of Example 1, which is also known as oxaldiimidedihydrazide, oxamide dihydrazone and as carbohydrazidine, is acidified by adding 50 drops of concentrated sulfuric acid and 30 grams of a 30% aqueous solution of glyoxal are added. A yellow-green fluorescence appears immediately and an insoluble condensate soon begins to form.

The mixture is allowed to stand overnight and is then filtered. The resulting condensation product after drying under a vacuum is obtained as 12.5 grams of a brittle black solid which is polymeric in character. The reaction is believed to be as follows:

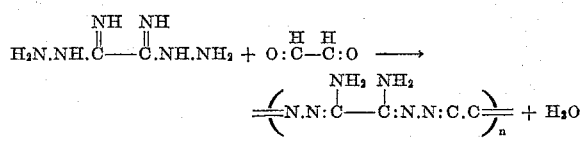

The linear character of the product is indicated by its infrared spectra which show the presence of —NH groups.

EXAMPLE 3

The product of Example 2 can also be prepared in alcohol. The solution of 200 grams of 30% aqueous glyoxal solution in 2 liters of ethanol is acidified with a few drops of glacial acetic acid and 58 grams (0.5 mol) of oxamide dihydrazone are added. The mixture is heated for one-half hour on a steam bath and then cooled and filtered. The dark yellow product is washed with alcohol and with ether and dried; the yield is 60 grams.

What we claim is:

1. A solid propellant mixture consisting essentially of stoichiometric amounts of a solid propellant oxidant selected from the group consisting of alkali metal perchlorates, alkali metal nitrates, ammonium perchlorate, ammonium nitrate and mixtures thereof, and a fuel selected from the class consisting of oxamide dihydrazone and an oxamide dihydrazone-glyoxal condensation product, said product being prepared by reaction of oxamide dihydrazone with at least equimolar amounts of glyoxal in an acidic medium.

2. A mixture according to claim 1, in which the alkali metal nitrate is sodium nitrate and the fuel is oxamide dihydrazone.

3. A mixture according to claim 1, in which the alkali metal nitrate is potassium nitrate and the fuel is oxamide dihydrazone.

4. A mixture according to claim 1, in which the alkali metal perchlorate is lithium perchlorate and the fuel is an oxamide dihydrazone-glyoxal condensation product.

5. A mixture according to claim 1, in which the alkali metal perchlorate is ammonium perchlorate and the fuel is oxamide dihydrazone.

6. A mixture according to claim 1, in which the alkali metal perchlorate is potasssium perchlorate and the fuel is oxamide dihydrazone.

References Cited in the file of this patent

UNITED STATES PATENTS

| | | |
|---|---|---|
| 2,159,234 | Taylor | May 23, 1939 |
| 2,622,277 | Bonell et al. | Dec. 23, 1952 |